United States Patent [19]
Ward

[11] Patent Number: 5,618,998
[45] Date of Patent: Apr. 8, 1997

[54] MASK FOR AN INSTRUMENT PANEL

[76] Inventor: Cora E. Ward, 16 Ramey Street, R.R. #8, Fredericton, N. B., Canada, E3B 5W5

[21] Appl. No.: 574,000

[22] Filed: Dec. 18, 1995

[51] Int. Cl.$^6$ ..................................................... G01D 7/02
[52] U.S. Cl. ......................................... 73/866.3; 434/427
[58] Field of Search .......................... 73/866.3; 434/365, 434/370, 372, 404, 405, 427, 379, 430, 431, 433, 227, 233, 231

[56] References Cited

U.S. PATENT DOCUMENTS

| | | | |
|---|---|---|---|
| 2,167,131 | 7/1939 | Weidenborner | 437/427 |
| 3,699,789 | 10/1972 | Potzick . | |
| 4,475,366 | 10/1984 | Marneris . | |
| 4,728,294 | 3/1988 | Bredehorn | 434/327 |
| 4,886,457 | 12/1989 | Lon-Jeng | 434/191 |
| 5,096,317 | 3/1992 | Phillippe | 434/227 |
| 5,419,704 | 5/1995 | North | 434/227 |

*Primary Examiner*—Robert Raevis
*Attorney, Agent, or Firm*—Mario D. Theriault

[57] ABSTRACT

An apertured mask for enhancing the learning of specific functions controllable from an instrument panel by a trainee. In one embodiment, the mask for an instrument panel comprises an opaque overlay having at least one opening for revealing a group of instruments from this panel, and mounting means for retaining this overlay in a fixed relationship with the exclusive group of instruments. A plurality of juxtaposed flaps may also be provided for optionally covering a portion or an entirety of the opening of the mask. In another embodiment, any two juxtaposed flaps have along a common bordering edge thereof dust seal means for closing a gap between each flap. In a further embodiment, each mask from a plurality of masks for a same instrument panel, has a distinct set of apertures for revealing a distinct number of exclusive instruments from that panel, for teaching a trainee about a distinct process from a group of processes controllable from that instrument panel.

20 Claims, 5 Drawing Sheets

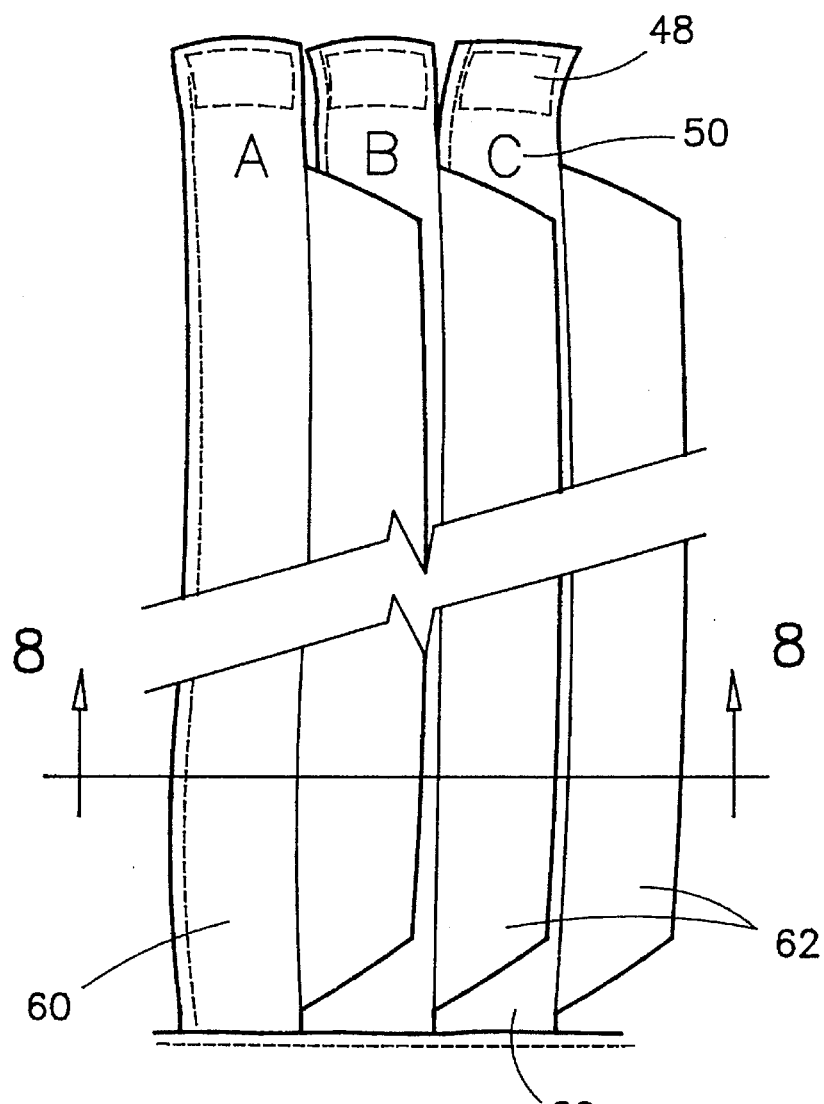
FIG. 7
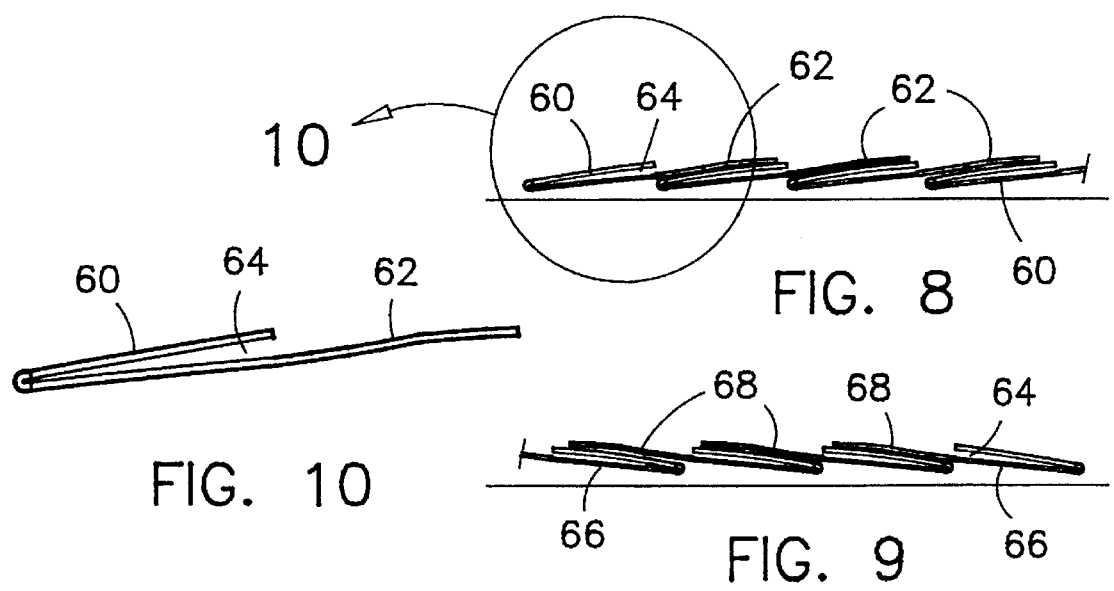
FIG. 8
FIG. 10
FIG. 9

MASK FOR AN INSTRUMENT PANEL

FIELD OF THE INVENTION

The present invention relates to an opaque overlay for concealing a nonessential portion of an instrument panel. More particularly, the present invention relates to an apertured mask which is affixed, primarily for educational purposes, over an instrument panel to limit visual and tactile access to that panel by an inexperienced user.

BACKGROUND OF THE INVENTION

An instrument panel is generally complex and may at times be relatively confusing for a novice. For example, a typical sound mixer console of a broadcast studio comprises an assortment of dials, indicator lights and several channels each having numerous buttons for controlling sound pitch, intensity, echo effect, fading, and mixing sound signals from different sound input devices. The sight of such a multitude of instruments is known to intimidate most individuals training on these consoles. Hence, teaching those trainees is often tedious and not effected without experiencing numerous errors. Therefore, an instructor's attendance is continuously required during a training session, to prevent the transmission of unwanted audio signals.

Learning to operate industrial control consoles is similarly known to be a substantial, mind-boggling undertaking for new employees. These individuals are often overwhelmed by the apparent necessity to comprehend at once all functions controllable from a console cabinet. The ability of these trainees to learn the operation of a single process is often obscured by the complexity of the whole instrument layout. Such learning difficulties in an industrial environment may lead a trainee to operate an improper piece of machinery, thereby endangering the health of other workers or causing extensive equipment damages.

SUMMARY OF THE INVENTION

In the present invention, however, there is provided a mask for concealing a nonessential portion of an instrument panel, whereby an inexperienced user of this instrument panel is less likely to inadvertently operate an improper instrument on that panel.

In accordance to one aspect of the present invention, the mask for an instrument panel comprises an opaque overlay having at least one opening for revealing a group of instruments on this instrument panel. The mask also comprises mounting means for retaining this opaque overlay over the panel such that the opening remains stationary relative to the selected group of instruments.

The mask for an instrument panel of the present invention allows an individual to focus his (her) attention on the selected group of instruments, and to perform a single task without being overwhelmed by the complexity of the whole. A lay-user is then able to safely operate the instruments of the panel without constant supervision by an instructor.

In accordance to another aspect of the present invention, there is provided a mask for an instrument panel comprising an opaque overlay having at least one opening for revealing a group of instruments, and flap means for optionally covering entirely the opening during periods the instrument panel is not in use.

When the opening is covered entirely by the flap means, the console is protected from dust and from rubbing and touching by personnel passing or standing nearby. This is a commendable advantage especially because consoles are generally substantially expensive to purchase and to repair.

In accordance to a further aspect of the present invention, the flap means of the mask for an instrument panel is a plurality of juxtaposed elongated flaps, whereby a portion of the group of instruments is selectively exposed for use, by opening one or more of the juxtaposed elongated flaps.

A mask for an instrument panel of the present invention having an opening coverable by a plurality of juxtaposed flaps is of great advantage for training individuals on the uses of the instruments of a console. Trainess can learn at their own pace, opening additional flaps only when they have surmounted the discomfort of learning an initial smaller group of instruments. It has been observed that trainees using the mask of the present invention for learning the functions of a sound studio console, generally obtain better results and are trained in a shorter time than other persons trying to learn while looking at the entire panoply of knobs and meters.

Likewise, a sound mixer console for example, with a mask of the present invention having a plurality of juxtaposed flaps, may be confidently let for rent to a charitable organization for a fund-raising concert or for other similar social events. The console may be fitted beforehand with the mask of the present invention where a minimum number of instruments are visible and accessible. Then, it becomes easy to adequately and quickly train a borrower on the requested functions, when he (she) takes possession of the console.

In accordance to yet another aspect of the present invention, there is provided an educational kit for enhancing a learning of functions of a console cabinet. The educational kit of the present invention comprises a jacket means for covering partially an upper portion of this console cabinet. The jacket means has at least one opening for revealing a group of instruments on that cabinet. The educational kit also comprises a removable mask means for optionally covering a nonessential portion of the group of instruments, and mounting means for retaining the mask means to the jacket means such that the mask means remains in place relative to the group of exclusive instruments accessible through the opening.

The mask means of this further aspect of the present invention may preferably comprise a first mask to cover the opening entirely for preventing the use of the console cabinet during shutdown conditions or other similar periods of restricted use, and one or more apertured masks wherein each apertured mask reveals a specific number of instruments. Each apertured mask is optionally used for teaching a trainee about a distinct process from a group of processes controllable from this console cabinet.

Such an aforesaid educational device enhances the trainee's learning ability by focusing his (her) attention on an exclusive group of instruments, while preventing precarious operation of machinery controlled from this control cabinet.

BRIEF DESCRIPTION OF THE DRAWINGS

The preferred embodiments of the invention will be further understood from the following description, with reference to the drawings in which:

FIG. 7 is a plan view of three juxtaposed flaps of the mask of FIG. 6.

FIG. 8 is a cross section view of the juxtaposed elongated flaps of FIG. 7, viewed through section line 8—8 of FIG. 7.

FIG. 9 is a cross section view of the juxtaposed flaps of the mask of FIG. 6, but from a right hand side of the mask.

FIG. 10 is an enlarged view of a single flap of FIG. 8 as indicated by detail 10 of FIG. 8.

DETAILED DESCRIPTION OF THE PREFERRED EMBODIMENTS

Figure 1:
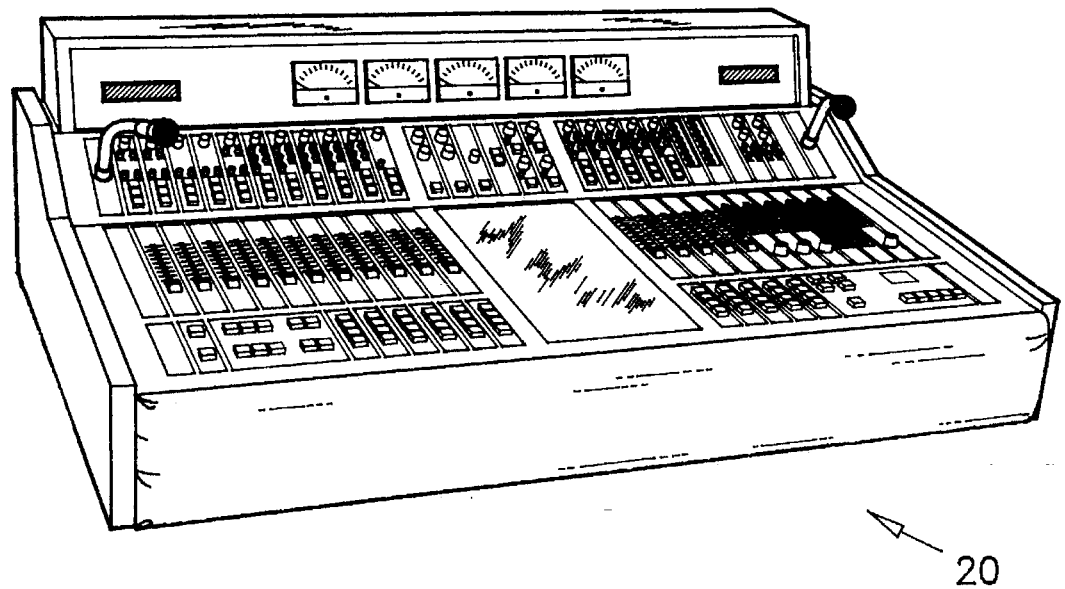
FIG. 1 is a perspective front, left and top view of a typical sound mixer console of a radio broadcast studio. The sound mixer console of this figure is for illustrative purposes only and forms no part of the disclosed and claimed invention.

Referring to FIG. 1, there is illustrated for informative purposes only, a typical sound mixing console 20 for a recording studio, The console 20 illustrated comprises sixteen channels capable of receiving audio signals from microphones, compact disc players, tape decks, cassette decks, turn tables and reel-to-reel tape machines. The console 20 illustrated also comprises three output busses to audition a recording, to record a program or to verify cueing of parts for a radio presentation. The console also incorporates multi-line input selectors, equalizers and master control buttons.

The sight of such a complicated array of slider-potentiometers, push buttons and knobs may be somewhat intimidating for a beginner in the field of sound mixing.

Figure 2:
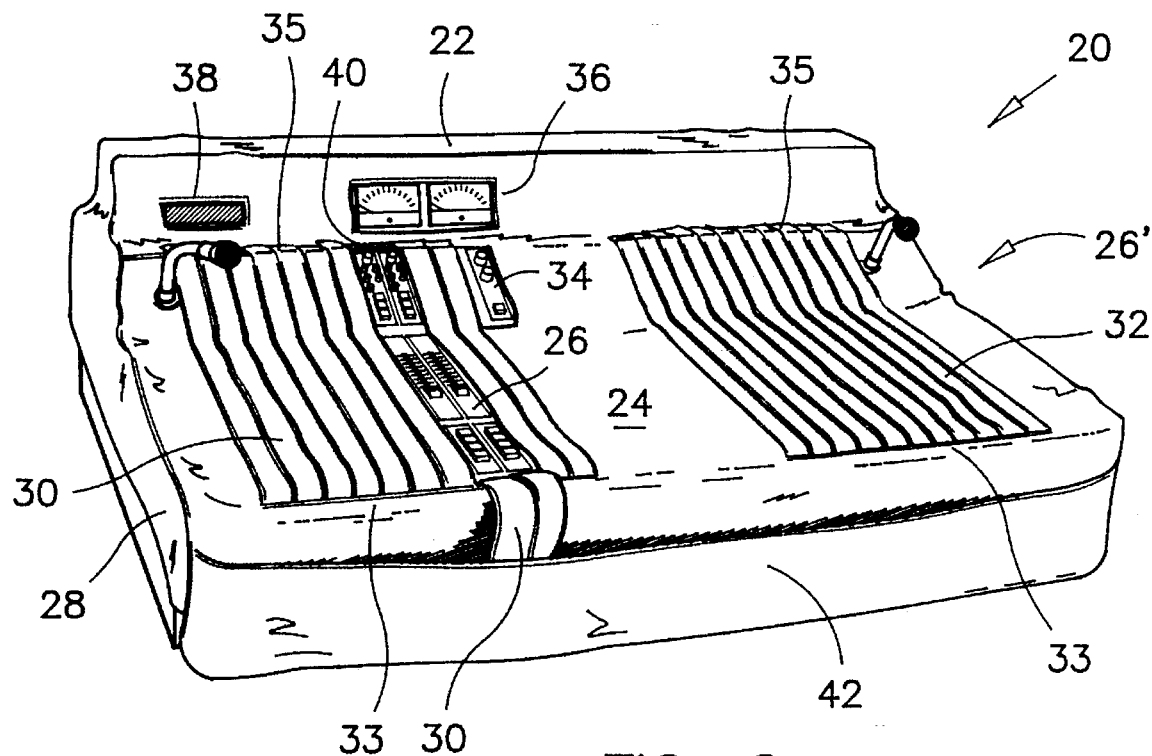
FIG. 2 is another perspective front, left and top view of the sound mixer console of FIG. 1 being partly covered by one embodiment of the mask for an instrument panel of the present invention.

On the sound console 20 of FIG. 2, however, all nonessential instruments thereon are covered by a mask 22 for an instrument panel of a first preferred embodiment of the present invention. The mask 22 has an opaque overlay 24, and an opening 26 corresponding to a location of a group of instruments which are to be used during a forthcoming training session. The opening 26 highlights the appropriate instruments so that a trainee can focus his (her) attention on the portion of the console being studied.

The mask 22 of a first preferred embodiment also has a flange member 28 around the opaque overlay 24 for encasing a contour of the instrument console 20, to retain the overlay 24 and the opening 26 in a fixed relationship with the instrument panel of this console 20.

It will be evident to those skilled in the art that the opaque overlay 24 may also be retained on the instrument panel solely, or in association with flange 28, by a cooperative combination of a plurality of pieces of gripping material on the instrument panel and a plurality of pieces of mating material on the underside of the opaque overlay 24. The gripping and mating materials referred to herein are preferably of the type commercially known by the trade name VELCRO™.

The mask 22 for an instrument panel of a first preferred embodiment also has a first plurality of juxtaposed elongated flaps 30 of a first type, for optionally covering a first opening 26 on a left hand side of the console 20, and a second plurality of juxtaposed elongated flaps 32 also of a first type for optionally covering a second opening 26' on the right hand side of the console 20, The second opening 26' on the right hand side of the console 20 is not visible because of being entirely covered by the second plurality of juxtaposed elongated flaps 32.

The mask 22 of the first preferred embodiment also has a number of smaller openings 34, 36, 38 for exposing dials, meters and control buttons relevant to the operation of the instruments accessible through one of the openings 26, 26'.

Each of juxtaposed elongated flaps 30, 32 preferably has a width corresponding to a width of one channel; in other words, to a width of one column of instruments on the instrument console 20.

Juxtaposed elongated flaps 30, 32 are preferably attached at a first end thereof to a near edge 33 of a respective opening 26 or 26'. Elongated flaps 30, 32, are foldable over a respective opening 26 or 26' to cover an entire span thereof. Elongated flaps 30, 32 are attachable to a far edge 35 of a respective opening 26 or 26' by means of gripping material 40 along a far edge 35 of opening 26, 26', and of mating material on a second end of each of flaps 30, 32.

The mask 22 for an instrument panel of the first preferred embodiment also has a pocket 42 along a front portion thereof, for stowing away flaps 30, 32 when these flaps are not deployed for covering openings 26, 26'.

In use, openings 26, 26' of the mask 22 for an instrument panel of the first preferred embodiment may be opened to expose a variety of different groups of instruments, by folding away one or more flaps 30, 32. Instruments may be exposed according to the requirement of a particular training session, or according to the learning ability of a trainee.

The mask 22 for an instrument panel of the first preferred embodiment is preferably made of a pliable fabric material such that the opaque overlay 24 conforms to multi-plane, or to non-planar surfaces of an instrument panel. The mask 22 for an instrument panel is preferably made of a pliable and washable fabric material, having good liquid absorbtion and dust retention characteristics. Such a fabric material protects an instrument console 20 in a dance hall or a classroom environment, where particles from food and drink falling over the console 20 may be hardly avoidable. The mask 22 for an instrument panel is preferably made of a cotton base fabric having a thickness of about at least 15 mils, and ideally having a thickness of about at least 30 mils.

Figure 3:
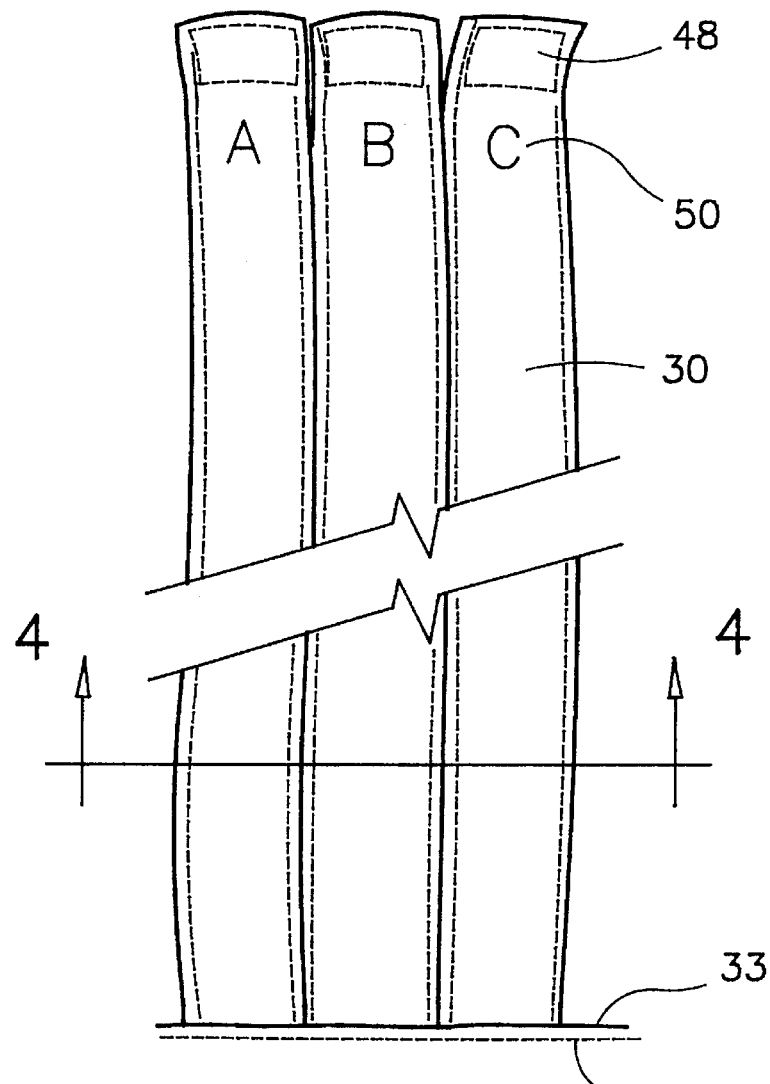
FIG. 3 is a plan view of three juxtaposed flaps of a first type of the mask of the present invention.
Figure 4:
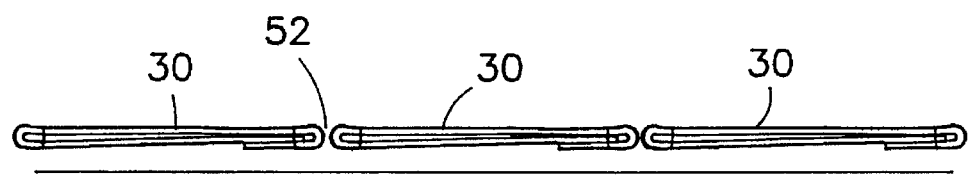
FIG. 4 is a cross section view of the juxtaposed elongated flaps of FIG. 3, viewed through section line 4—4 of FIG. 3.
Figure 5:
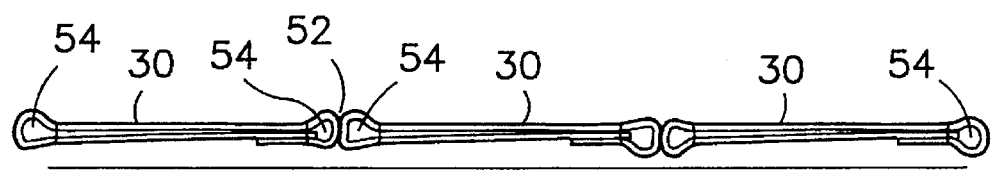
FIG. 5 is a cross section view of the juxtaposed elongated flaps of one preferred embodiment having hollow piping seams along the longitudinal edges thereof.
Figure 6:
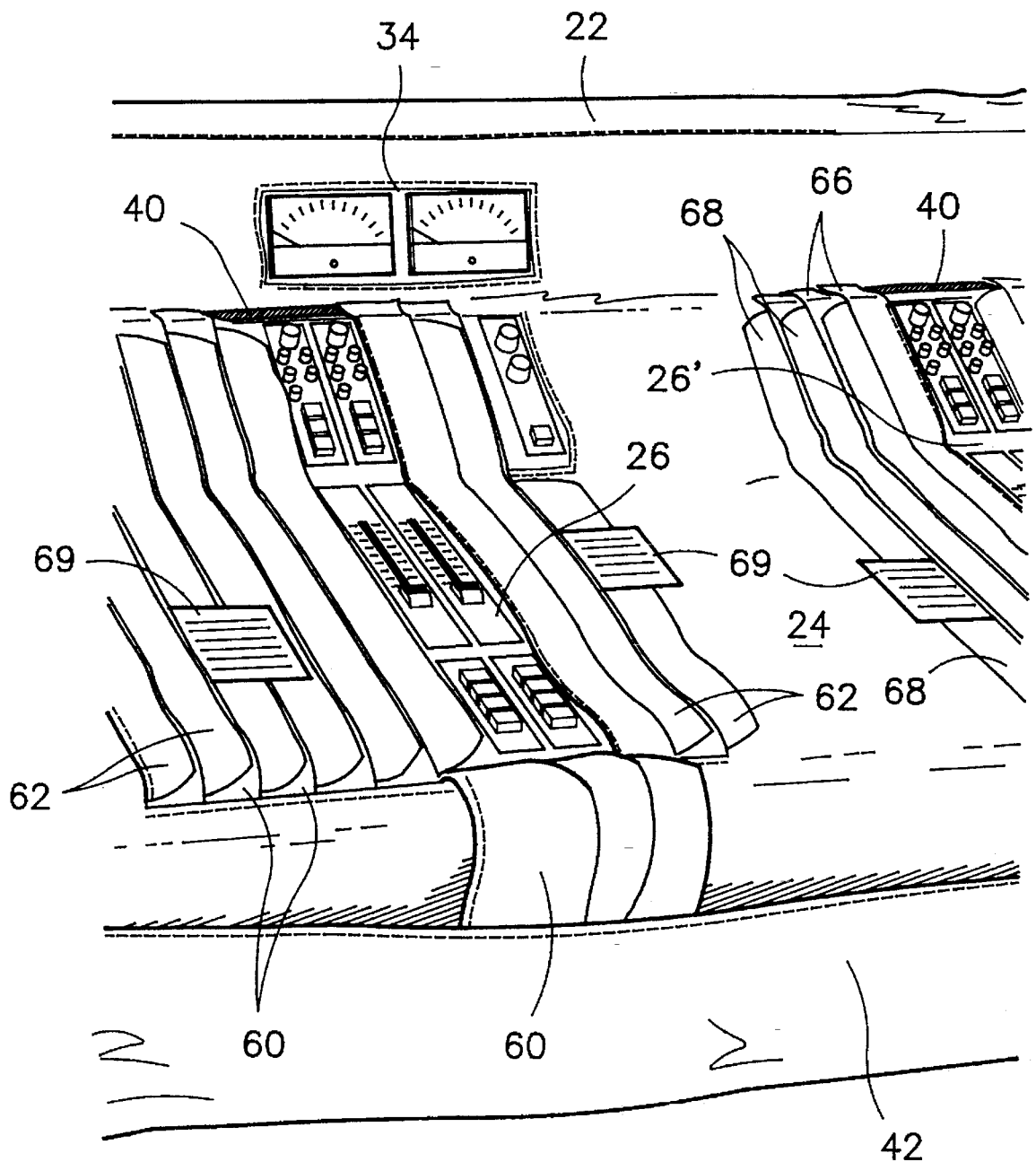
FIG. 6 is a partial perspective front and top view of a sound mixer console illustrating a second preferred embodiment of a mask of the present invention wherein each juxtaposed flap of a second type overlaps an adjacent flap to enhance dust inhibiting capabilities of the mask.

Referring now to FIGS. 3 and 4, there is illustrated three juxtaposed elongated flaps 30 of the mask 22 of a first preferred embodiment. The flaps 30 are attached at a first end thereof to a near edge 33 of opening 26 by means of a seam 46. On FIG. 3, there is also illustrated in dotted lines, a piece of mating material 48 attached to the underside of a second end of flap 30. All flaps 30, 32 have each a similar piece of mating material 48 for attaching to gripping material 40 along a far edge 35 of openings 26, 26'. Each of flaps 30, 32 may also bear a label 50 to facilitate a referencing of instruments thereunder.

Each of juxtaposed elongated flaps 30, 32 is preferably made of a double or more thicknesses of the aforesaid preferred material such as illustrated on FIG. 4. The rigidity obtained thereby provides an advantage of giving each of flaps 30, 32, a longitudinal stiffness for maintaining a gap 52 between each of flaps 30, 32 to a minimum width. The rigidity obtained thereby provides the further advantage that each of flaps 30, 32 remains in a relatively flat orientation even when resting on irregular surfaces of instruments being covered.

In another aspect of the mask 22 of the first preferred embodiment, each of elongated flaps 30, 32 has along both longitudinal edges, a hollow piping seam 54 enlarging slightly a preferred width of each flap 30, 32. In this other aspect of the mask 22 for an instrument panel of a first preferred embodiment, two adjacent hollow piping seams 54 interact with one-another to close gap 52 completely, thereby enhancing a dust inhibition characteristic of the mask.

Referring now to FIGS. 6 to 9, there is illustrated a mask 22 for an instrument panel of a second preferred embodiment. In this second preferred embodiment, opening 26 is coverable by a first plurality of juxtaposed elongated flaps 60 of a second type, and opening 26' is coverable by a plurality of juxtaposed elongated flaps 66 also of a second type. Each of flaps 60, 66 has a respective over lap member 62 or 68 for covering a portion of a bordering flap 60 or 66, for preventing dust and other foreign particles from entering therebetween when flaps 60, 66 are deployed for covering openings 26, 26'.

Each of flaps 60, 66 further has a fold 64 having an opened side facing a direction of overlap member 62 or 68, whereby dust particles on overlap members 62, 68 displaced toward this fold 64 are caught thereinto.

Flaps 60 on a left hand side of console 20 have an overlap member 62 on a right hand side thereof, and flaps 66 on a right hand side of console 20 have an overlap member 68 on a left hand side thereof. Such a disposition of flaps 60, 66 and overlap members 62, 68 is convenient for a user sitting near a middle portion of this console 20 for optionally using folds 64 for retaining instruction cards 69 pertaining to an operation of instruments accessible through opening 26.

A third preferred embodiment of the present invention is illustrated on FIGS. 11 to 14. This third preferred embodiment is an educational kit for teaching a new employee an operation of an industrial console cabinet 70. The educational kit comprises a jacket means 72 covering partially an upper portion of the control cabinet 70. The jacket means 72 has a focal opening 74 for revealing a group of instruments on this console cabinet 70 and a flange member 78 for encasing a contour of the console 70 such that the focal opening 74 remains stationary relative to that group of instruments. The jacket means 72 also has a plurality of a retaining means 76 for retaining thereon one of a group of mask members 80, 82 or 84.

The jacket means 72 and the mask members 80, 82 and 84 are also preferably made of a pliable, absorbent, and washable fabric material for the same reasons as those already described relative to the masks for instrument panels of the first and second preferred embodiments.

Each of masks 80, 82 and 84 has a plurality of attachment means 86 for mating respectively with retaining means 76 on jacket means 72. Retaining means 76 and attachment means 86 are preferably of the snap-button type, but other fastening means known in that art of garment making may also be used, The educational kit of this preferred embodiment of the present invention preferably has a first mask member 80 having a closed surface for covering entirely the focal opening 74, during nonuse periods of the control cabinet for example.

Any of the mask members 80, 82 or 84, may have a pocket member 88 for holding documents relating to a use of the console cabinet 70. Hence, a new employee training on this console cabinet 70 may readily find instructions about the functions controllable from this cabinet.

Figure 11:
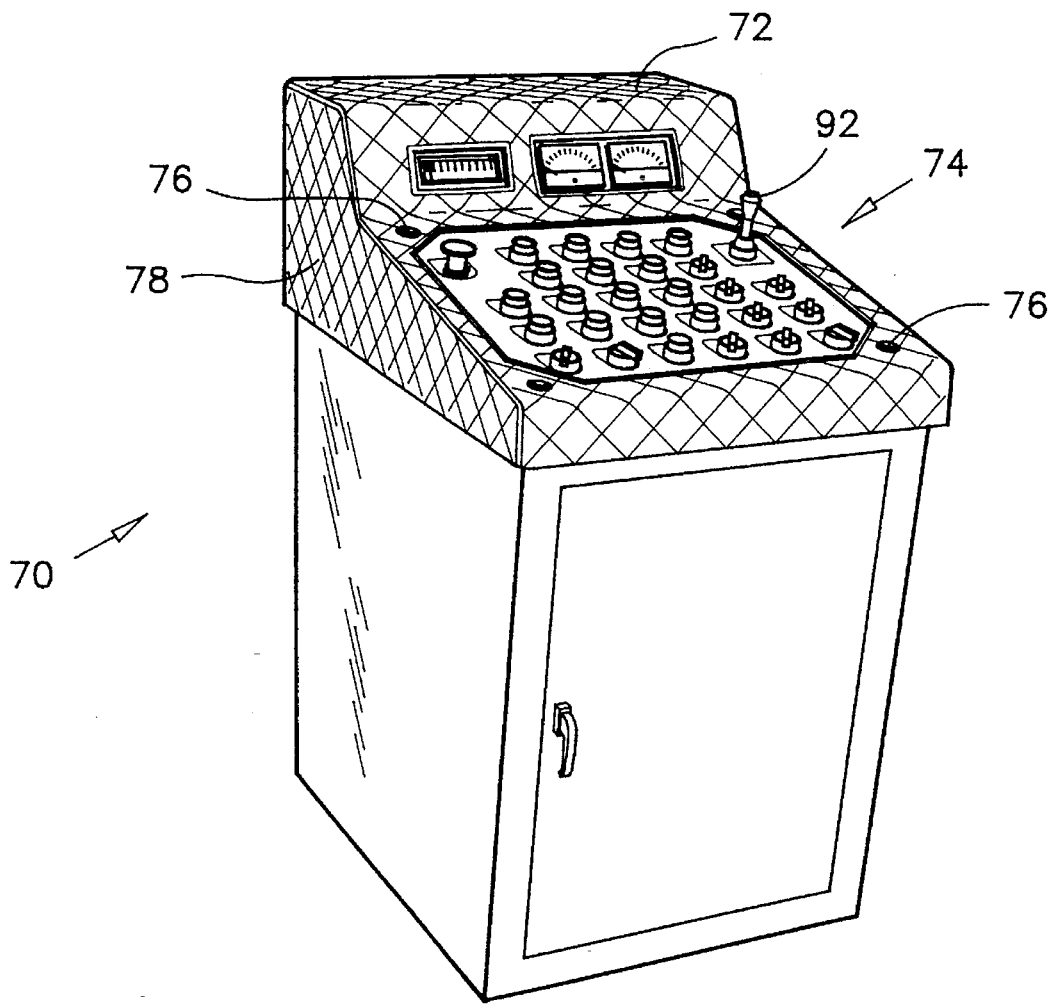
FIG. 11 is a perspective front, top and left view of an industrial control cabinet having a jacket means of an educational kit of a third preferred embodiment of the present invention.
Figure 12:
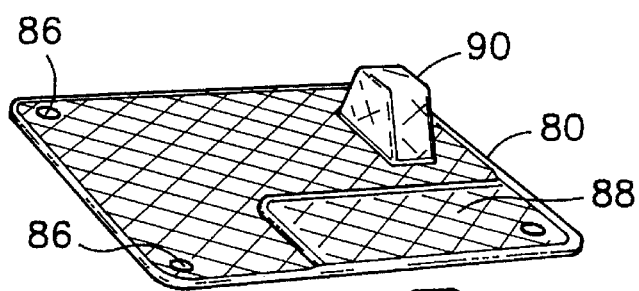
FIG. 12 is a perspective top and left view of a first mask of an educational kit of a third preferred embodiment.
Figure 13:
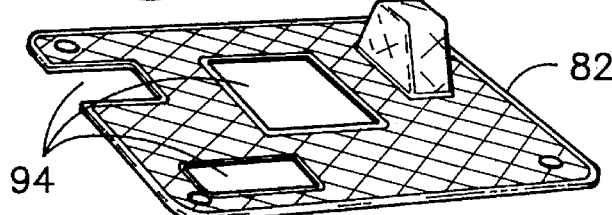
FIG. 13 is a perspective top and left view of a second mask of an educational kit of a third preferred embodiment.
Figure 14:
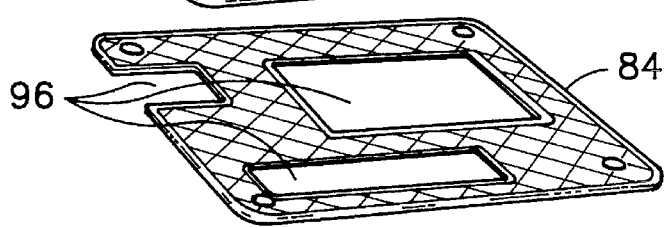
FIG. 14 is a perspective top and left view of a third mask of an educational kit of a third preferred embodiment of the present invention.

Any of the mask members 80, 82 or 84 may also comprise one or more cap member 90 for covering prominent instruments such as a joystick as illustrated by numeral 92 on FIG. 11.

In this illustrated educational kit of a third preferred embodiment of the present invention, mask member 82 has a first set of apertures 94 for revealing a first group of instruments controlling a first process from a group of processes controllable from the control cabinet 70. Similarly, mask member 84 has a second set of apertures 96 for revealing a second group of instruments controlling a second process from the same group of processes.

Hence, an educational kit as illustrated and described facilitates the training of new employees on that console cabinet, while preventing access to instruments which could otherwise be mistakenly activated with regretful consequences.

This description of the present invention having mask means to cover a nonessential portion of an instrument panel, shall not constitute a limitation in the scope of its applications. Also it shall not constitute a limitation in the possible configuration of its elements. Other methods for retaining an opaque overlay over an instrument panel, to limit a visual and tactile access to the instruments of that panel may be derived from the embodiments thus described without offering significant improvement over the stated advantages.

Therefore, the preferred embodiments of the present invention as described herein is not limited thereto, and it will be apparent to those skilled in the art that numerous modifications form part of the present invention insofar as they do not depart from the spirit, nature and scope of the described and claimed invention.

I claim:

1. A mask for concealing a nonessential portion of an instrument panel, comprising:

an opaque overlay having at least one opening for revealing a selected group of instruments from said instrument panel; and mounting means for retaining said opaque overlay over said instrument panel such that said at least one opening remains substantially stationary relative to said selected group of instruments;

whereby a user of said instrument panel can focus his (her) attention on said selected group of instruments without being overwhelmed by a complexity of said nonessential portion.

2. A mask as claimed in claim 1 wherein said mounting means is a cooperative combination of a plurality of pieces of gripping material attached to said instrument panel, and a plurality of pieces of mating material attached to an underside of said opaque overlay.

3. A mask as claimed in claim 1 wherein said instrument panel is part of a console, and said mounting means is a flange member on said opaque overlay, encasing a contour of said console.

4. A mask as claimed in claim 1 wherein said opaque overlay is made with a dust retentive material.

5. A mask as claimed in claim 1 wherein said opaque overlay is made of a pliable material, and is thereby capable of conforming to surface irregularities of said instrument panel.

6. A mask as claimed in claim 5 wherein said opaque overlay is made of a liquid-absorbent fabric.

7. A mask as claimed in claim 1 wherein said opaque overlay comprises flap means for optionally covering said opening entirely during nonuse periods of said instrument panel.

8. A mask as claimed in claim 7 wherein said flap means is a plurality of juxtaposed flaps, whereby a portion of said selected group of instruments are selectively concealed by closing one or more of said juxtaposed flaps.

9. A mask as claimed in claim 8 wherein any two adjacent flaps of said juxtaposed flaps have each along a common bordering edge, a hollow piping seam interacting with one-another for closing a gap between each said two adjacent flaps; for enhancing a dust inhibition characteristic thereof when said two adjacent flaps are covering said opening.

10. A mask as claimed in claim 8 wherein each of said juxtaposed flaps overlaps a portion of an adjacent said juxtaposed flap to prevent dust and other foreign particles from entering said opening when said juxtaposed flaps are covering said opening.

11. A mask as claimed in claim 10 wherein each of said juxtaposed flaps has a fold for optionally retaining an instruction card on said instrument panel, when said juxtaposed flap is covering said opening.

12. A mask as claimed in claim 11 wherein each of said juxtaposed flaps comprises:

an overlapping member covering substantially entirely said adjacent juxtaposed flap, and wherein;

an opened side of said fold faces said overlapping member;

whereby dust particles or other similar foreign material on said opaque overlay, displaced toward said opened side are caught into said fold.

13. A mask as claimed in claim 8 also having a pocket along an edge of said opaque overlay for receiving said juxtaposed flaps in a folded mode.

14. An educational kit for enhancing a learning of functions of a console cabinet, comprising:

a jacket means having at least one focal opening for revealing a group of instruments on said cabinet;

removable mask means for optionally covering a nonessential portion of said group of instruments; and mounting means for retaining said removable mask means over said focal opening;

whereby a trainee learning a function of said console cabinet can focus his (her) attention on a number of exclusive instruments accessible through said mask means, essential to said function, while being restricted from inadvertently operating an inappropriate instrument from said nonessential portion of said group of instruments.

15. An educational kit as claimed in claim 14 wherein said jacket means is held on said control cabinet by a flange member encasing a contour of said console cabinet.

16. An educational kit as claimed in claim 14 wherein said removable mask means comprises a first mask member having a closed surface for covering entirely said focal opening during nonuse periods of the console cabinet.

17. An educational kit as claimed in claim 16 wherein said first mask has a pocket for holding documents relating to a use of said console cabinet.

18. An educational kit as claimed in claim 16 wherein said removable mask means also comprises:

a plurality of mask members having each a distinct set of apertures for revealing a distinct number of exclusive instruments from said group of instruments;

each of said plurality of mask members being optionally individually mounted on said focal opening for teaching a trainee about a distinct process from a group of processes controllable from said group of instruments.

19. A method for teaching a trainee about a use of an instrument console, comprising the steps of:

covering nonessential instruments of said instrument console with an apertured mask;

timely enlarging a size of an aperture of said mask according to a learning ability of said trainee.

20. A method for teaching a trainee about a use of an instrument console as claimed in claim 19, wherein said step of covering said nonessential instruments of said instrument console is achieved by performing the following actions:

selectively covering a first set of nonessential instruments with a first apertured mask, or covering a second set of nonessential instruments with a second apertured mask;

said first or second apertured mask being optionally used for teaching said trainee respectively about a first or about a second set of functions from a group of functions controllable from said instrument console.

* * * * *